Sept. 3, 1963　　　H. O. SCHJOLIN　　　3,102,398
REFRIGERATING APPARATUS
Filed Dec. 27, 1960
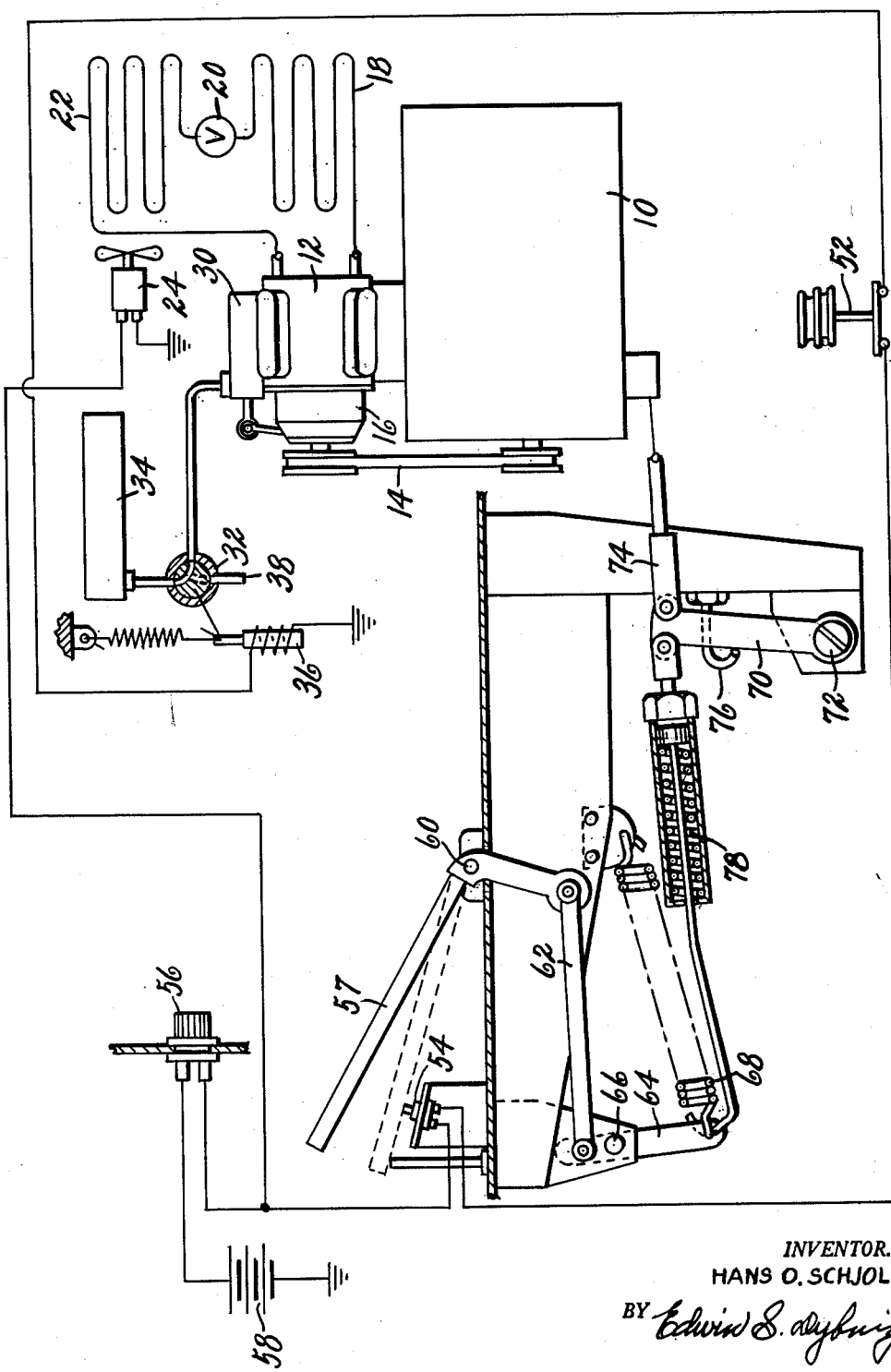
INVENTOR.
HANS O. SCHJOLIN
BY Edwin S. Dybvig
HIS ATTORNEY

United States Patent Office 3,102,398
Patented Sept. 3, 1963

3,102,398
REFRIGERATING APPARATUS
Hans O. Schjolin, Birmingham, Mich., assignor to General Motors Corporation, Detroit, Mich., a corporation of Delaware
Filed Dec. 27, 1960, Ser. No. 78,608
1 Claim. (Cl. 62—243)

This invention relates to refrigerating apparatus and more particularly to an air conditioning system for use in a bus or the like.

This invention represents an improvement over the compressor control arrangement disclosed in Gibson Patent No. 2,746,261 wherein an arrangement is shown for declutching the compressor from the car engine when the accelerator pedal is moved to the full open throttle position.

Clutch control arrangements of the type disclosed in Gibson Patent 2,746,261 have the disadvantage that the driver has only partial control over the clutch in that it is necessary to hold the accelerator pedal in the wide open position in order to keep the compressor from utilizing much needed engine power during climbing hills and passing cars. Furthermore, in an arrangement of the type shown therein, the clutch may be called on to operate several times before the driver succeeds in passing some cars under difficult passing conditions and this causes needless wear on the clutch.

It is an object of this invention to provide an arrangement in which the refrigerant compressor is declutched in response to moving the accelerator pedal beyond the wide open throttle position and is reengaged in response to a second movement of the accelerator pedal beyond the wide open throttle position. More particularly, it is an object of this invention to provide a clutch control switch which is similar in construction to a dimmer switch and which is adapted to be operated in response to movement of the accelerator pedal.

It has been found that with a control arrangement of the type disclosed herein the driver has complete control of the clutch operation. When using my invention, it is possible to declutch the compressor for two or more minutes at a time in 100° temperatures without materially effecting passenger comfort as the air circulating means may be kept in operation even when the compressor is declutched.

Further objects and advantages of the present invention will be apparent from the following description, reference being had to the accompanying drawing wherein a preferred embodiment of the present invention is clearly shown.

In the drawing:

The sole FIGURE of the drawing schematically shows a vehicle air conditioning system embodying the invention.

Referring now to the drawing wherein a preferred embodiment of the invention has been shown, reference numeral 10 designates the main car or bus engine which is used not only for propelling the vehicle but is also used for supplying power for operating a refrigerant compressor 12 through clutch 16. For purposes of illustration, a belt drive 14 has been shown for transmitting power from the engine to the compressor but any other suitable drive could be used. The compressor 12 is connected in series refrigerant flow relationship with a refrigerant condenser 18, an expansion device 20 and an air cooling evaporator 22. A fan 24 circulates air to be conditioned over the evaporator 22. The refrigerating system is of the type which is more fully disclosed in my prior Patent No. 2,918,805 and my copending application Serial No. 849,201, filed October 28, 1959, now Patent No. 2,982,111, to which reference may be had for a more complete description of the refrigerating system and its arrangement on the bus.

The clutch 16 is adapted to be controlled by means of a pneumatic actuator 30 which, in turn, is controlled by a solenoid operated valve 32. The valve 32 is arranged to control the flow of compressed air from a compressed air supply 34 to the clutch actuator 30. The valve 32 is under the control of a solenoid 36. Whenever the solenoid 36 is energized, the valve 32 will occupy the position in which it is shown in solid lines in the drawing and will serve to supply compressed air from the source 34 to the clutch actuator 30 so as to maintain the clutch engaged whenever the solenoid 36 is energized. Upon deenergization of the solenoid 36, the valve 32 moves to the dotted line position and disconnects the actuator 30 from the compressed air supply 34 and thereby exhausts compressed air from the actuator 30 through the exhaust port 38.

The solenoid 36 is arranged in a control circuit which includes a manually operated switch 56 located on the dashboard, an overrule switch 54, and a safety switch 52. The switch 52 is under control of the compressed air pressure and only serves to open the circuit when the compressed air pressure drops below a predetermined value, such as sixty-five pounds per square inch.

The overrule switch 54 is arranged as shown and is adapted to be actuated in response to depression of the accelerator pedal 57 slightly beyond the maximum open throttle position.

As shown in the drawing, the accelerator pedal 57 is pivotally supported at 60 and serves to actuate a link 62 connected to the upper end of a link 64 pivotally supported on a fixed pin 66. A coil spring 68, which is fixed at one end and which has its other end attached to the lever 64, serves to bias the accelerator pedal into its uppermost position. An override spring assembly connects the lower end of lever 64 to the upper end of a lever 70 which has its lower end pivotally mounted on a fixed pivot 72. A throttle operating rod 74 is pivotally secured to the upper end of the lever 70 and serves to control the engine throttle in accordance with standard practice. A stop element 76 limits the extent to which the throttle can be opened and when the lever 70 strikes the stop 76, the throttle arm 74 cannot be moved any farther to the left. The arrangement of the stop 76 is such that the accelerator pedal is not fully depressed when the lever 70 strikes the stop 76 and the lever 70 strikes the stop 76 before the accelerator pedal actuates the switch 54. In order to actuate the switch 54 by the accelerator pedal 57 it is necessary to apply a greater than normal pressure to the accelerator pedal 57. This extra pressure serves to compress the spring 78 in the override spring assembly.

The switch 54 is of the type used in light dimming systems and serves to open the control circuit when depressed once and to reclose the control circuit when depressed a second time. For details of a switch of this type reference is made to U.S. Patent No. 2,298,782. Thus, the operator of the vehicle will momentarily depress the accelerator pedal to the maximum when it is desired to declutch the compressor so as to make all of the engine power available for hill climbing or passing. The manual control switch 56 is arranged on the dashboard and can be used for turning on and off the air conditioning system. A conventional storage battery 58 serves to supply power for the clutch control circuit.

By virtue of the above described arrangement, a bus operator can momentarily disengage the compressor clutch without turning off the air circulating fans for short periods of time, such as while passing another vehicle, without causing any appreciable change in the air temperature within the bus. The opeartor can select the time when he wants to declutch the compressor and can likewise select the time when he wants to resume operation of the compressor by momentarily depressing the accelerator pedal beyond the full open throttle position.

While the embodiment of the present invention as herein disclosed, constitutes a preferred form, it is to be understood that other forms might be adopted.

What is claimed is as follows:

In a refrigerating system, an evaporator, a condenser, a compressor, refrigerant flow connections between said compressor, condenser, and evaporator, means for circulating air to be conditioned in thermal exchange relationship with said evaporator, an engine, torque transmitting means including a clutch between said engine and said compressor, means including a switch for disengaging said clutch, a throttle rod controlling the speed of said engine, a foot pedal for operating said throttle rod, a stop for limiting the movement of said throttle rod, a yieldable connection between said foot pedal and said throttle rod whereby said foot pedal can be depressed beyond the position at which said stop limits the movement of said throttle rod, said switch being arranged to be actuated in response to maximum depression of said foot pedal, said switch serving to cause disengagement of said clutch upon actuation one time and serving to cause reengagement of said clutch upon actuation a second time.

References Cited in the file of this patent

UNITED STATES PATENTS

| | | |
|---|---|---|
| 2,166,635 | Locke | July 18, 1939 |
| 2,264,821 | Zukoski | Dec. 2, 1941 |
| 2,266,187 | Fitzgerald | Dec. 16, 1941 |
| 2,344,864 | Griswold | Mar. 21, 1944 |
| 2,746,261 | Gibson | May 22, 1956 |